United States Patent
Singer (10) Patent No.: US 10,813,722 B1
(45) Date of Patent: Oct. 27, 2020

(54) ORTHODONTIC BRACKET

(71) Applicant: Jay Russell Singer, Lantana, FL (US)

(72) Inventor: Jay Russell Singer, Lantana, FL (US)

(*) Notice: Subject to any disclaimer, the term of this patent is extended or adjusted under 35 U.S.C. 154(b) by 265 days.

(21) Appl. No.: 15/791,359

(22) Filed: Oct. 23, 2017

Related U.S. Application Data (60) Provisional application No. 62/412,943, filed on Oct. 26, 2016.

(51) Int. Cl.
*A61C 7/14* (2006.01)
*A61C 7/28* (2006.01)

(52) U.S. Cl.
CPC .............. *A61C 7/148* (2013.01); *A61C 7/28* (2013.01); *A61C 7/141* (2013.01)

(58) Field of Classification Search
CPC .................................................. A61C 7/12–34
USPC ........................................................ 433/8–24
See application file for complete search history.

(56) References Cited

U.S. PATENT DOCUMENTS

| | | | | |
|---|---|---|---|---|
| 6,632,088 B2* | 10/2003 | Voudouris | ................ | A61C 7/12 433/18 |
| 2006/0014116 A1* | 1/2006 | Maijer | ..................... | A61C 7/12 433/11 |
| 2017/0079750 A1* | 3/2017 | Blackburn | ............. | A61C 7/141 |

* cited by examiner

*Primary Examiner* — Matthew M Nelson
(74) *Attorney, Agent, or Firm* — John Rizvi; John Rizvi P.A.—The Patent Professor®

(57) ABSTRACT

An orthodontic bracket is provided including a hollow housing defining a cavity and having windows for accessing the cavity to allow an archwire to pass through the housing. One or more, and preferably at least two sets of rollers are provided within the hollow housing for reducing the friction on the archwire as it passes through the windows and the cavity of the housing. The orthodontic bracket preferably includes a first set of rollers located adjacent a first or entrance window and a second set of rollers located adjacent a second or exit window. Guide blocks are provided between the sets of rollers to prevent the archwire from kinking or binding within the housing. A mounting block or mesh pad is provided on a rear of the housing to attach the housing to a tooth and a cover is provided on a front of the housing to secure the sets of rollers within the housing. An external hook may be provided on the housing for attaching rubber bands or other tensioning devices to the orthodontic bracket.

19 Claims, 7 Drawing Sheets

ORTHODONTIC BRACKET

CROSS-REFERENCE TO RELATED APPLICATIONS

This application claims the benefit of U.S. Provisional Patent Application Ser. No. 62/412,943, filed on Oct. 26, 2016, which is incorporated herein in its entirety.

FIELD OF THE INVENTION

The present invention relates generally to orthodontic dental devices, and more particularly, to an orthodontic bracket for use in the correction of malocclusion of a patient's teeth and for receipt of an archwire with minimal friction, the bracket comprising rollers for the rolling thereon of the archwire.

BACKGROUND OF THE INVENTION

Beginning with the eruption of the deciduous dentition, but more commonly with the eruption of the permanent dentition in childhood, many individuals develop crowded, spaced, or misaligned teeth (commonly called crooked teeth), or other conditions of malocclusion. The teeth may be tipped or angulated right or left and/or front or back relative to each other or may, even be rotated about a vertical tooth axis. Malocclusion can result in orthopedic conditions affecting the relationship of the upper and lower jaws to each other, dysfunction of the temporo-mandibular joint (TMJ), difficulty chewing and swallowing, obligatory mouthbreathing, airway issues, cosmetic issues, and affect psycho-social well-being and self-confidence.

Orthodontics and Dento-Facial Orthopedics is the specialty of dentistry that deals, in part, with the correction of malocclusion, facial growth, and the orthopedic function of the stomatognathic system, which is to say, the functional relationship of the upper and lower jaws (maxilla and mandible) to each other. In orthodontics, realignment of misaligned teeth is commonly carried out using an orthodontic system including support wires or archwires, and teeth brackets, anchors or tubes (hereinafter referred to generally as brackets). The brackets are temporarily attached to the misaligned teeth and an archwire is threaded through the brackets and adequately tensed to exert pressure on the brackets, which is transmitted by the brackets onto the teeth. The continuous pressure slowly and incrementally moves and realigns the teeth, over a period of time, into their correct positions.

Many types of tooth movement require an orthodontic bracket on a tooth, or brackets on multiple teeth as a group, to slide along the archwire. Examples include when crowded or overlapping teeth are spread apart for alignment, when spaced teeth with gaps between them are moved together, when back teeth are translated forward or when protruding front teeth are tipped or translated backward. Closure of extraction sites also typically involves sliding mechanics. This sliding action, which occurs very slowly over days or weeks, creates friction between the archwire and the bracket thus restricting tooth movement, Initially, as the tooth first begins to move, this friction is proportional to the coefficient of static friction related to the particular materials of the bracket and wire alloys. However, since applied orthodontic forces do not typically pass through the center of resistance of any tooth (which is below the gumline), tipping of teeth occurs rather quickly causing binding between the bracket archwire slot and the archwire, followed by microscopic notching of the archwire itself which dramatically restricts tooth movement. This slows the progression of treatment, lengthens treatment time, and necessitates the use of higher forces which have deleterious mechanical and biological side-effects. There have been many attempts to reduce the ubiquitous and universal problem of bracket-archwire friction in orthodontics with little success.

Accordingly, there is an established need for an orthodontic bracket that can easily and effectively retain an archwire with minimal friction to allow the system to readjust as the teeth are moved into position. There is a further established need for an orthodontic bracket that is easier to reach and facilitates insertion of the archwire when used in the teeth at the back of the mouth such as molars.

SUMMARY OF THE INVENTION

The present invention is directed to an orthodontic bracket for use in orthodontic procedures utilizing fixed appliances formed by brackets and archwires. The orthodontic bracket of the present invention receives the archwire rollingly therethrough, allowing the orthodontic bracket to slide and roll along the archwire under the application of orthodontic forces with reduced friction, binding and notching of the archwire. The orthodontic bracket includes a hollow housing having a cavity and windows for accessing the cavity. At least one set of rollers is provided within the hollow housing for rollingly supporting and retaining the archwire as it passes through the windows and the cavity of the housing. The orthodontic bracket preferably includes a first set of rollers located adjacent a first or entrance window and a second set of rollers located adjacent a second or exit window. Guide blocks can be provided between the sets of rollers to prevent the archwire from kinking or binding within the housing. An angled mounting block or mesh pad can be provided on the rear of the bracket to bond the bracket to a tooth. A cover can be provided on a front of the housing to secure the sets of rollers within the housing. An external hook may be provided on the housing for attaching rubber bands or other tensioning devices to the orthodontic bracket.

In a first implementation of the invention, an orthodontic bracket for use in orthodontic procedures requiring the securing of an orthodontic archwire comprises a hollow housing having a first end wall, a second end wall arranged opposite to the first end wall, a first window extending through the first end wall, and a second window extending through the second end wall. An interior cavity is defined inside the housing and is accessible through the first window and the second window. The bracket further includes at least one set of rollers located within the interior cavity. Each set of rollers comprises an upper roller and a lower roller which are rotatable relative to the housing. The upper and lower rollers comprise a respective drum. The drums of the upper and lower rollers are arranged in a spaced apart configuration defining a roller gap therebetween for the passing of an archwire therethrough and through the first and second windows.

In a second aspect, the orthodontic bracket can further include at least one set of pins extending inwardly from the housing into the interior cavity, with each pin rotatably supporting a roller. In some embodiments, each roller can include a drum defining a bore for receipt of the respective pin. Alternatively or additionally, each roller can include protruding flanges arranged in a spaced-apart configuration and configured to allow the passing therebetween of an archwire while preventing the archwire from slipping off the drum. Preferably, outer edges of the protruding flanges of each respective roller of the at least one set of rollers are spaced apart from outer edges of the protruding flanges of the remaining roller of the at least one set of rollers.

In another aspect, the housing can further include a rear wall, a front wall and opposed upper and lower walls. The first end wall, second end wall, upper wall and lower wall extend from the rear wall and delimit the interior cavity of the housing. In turn, the front wall is opposed to the rear wall and the at least one set of pins extends from the rear wall to the front wall.

In another aspect, the rotation axes of the rollers can be parallel to one another.

In another aspect, the bracket can more specifically include a first pair of rollers and a second pair of rollers. The first pair of rollers can be arranged closer to the first window than to the second window, and the second pair of rollers can be arranged closer to the second window than to the first window. Preferably, the roller gap of the first pair of rollers faces the first window and the roller gap of the second pair of rollers faces the second window.

In another aspect, the bracket can further include a wire guide positioned in the housing and configured to guide the wire from one of the first and second windows to the other of the first and second windows, between the upper and lower rollers of the at least one set of rollers. In some embodiments, the wire guide can include an upper guide block and a lower guide block, the upper and lower guide blocks defining a wire guide gap therebetween for passage of the archwire.

In another aspect, the wire guide can be positioned between the first and second pairs of rollers in the housing, and the roller gaps of the first and second pairs of rollers and the wire guide gap of the wire guide can be aligned. In some embodiments, the roller gaps of the first and second pairs of rollers and the wire guide gap of the wire guide can also be aligned with the first and second windows.

In another aspect, the bracket can further include a mounting block extending outwardly from a rear wall of the housing. In some embodiments, the mounting block can have an angled outer surface for attachment to a tooth.

In another aspect, at least one of the first window and the second window can be delimited by one or more angled surfaces formed in the housing and configured to facilitate inserting an archwire therethrough from outside the housing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an orthodontic bracket, anchor or tube (hereinafter referred to generally as bracket) for attachment to a patient's teeth and receiving and passing an orthodontic archwire therethrough with minimal friction.

Figure 1:
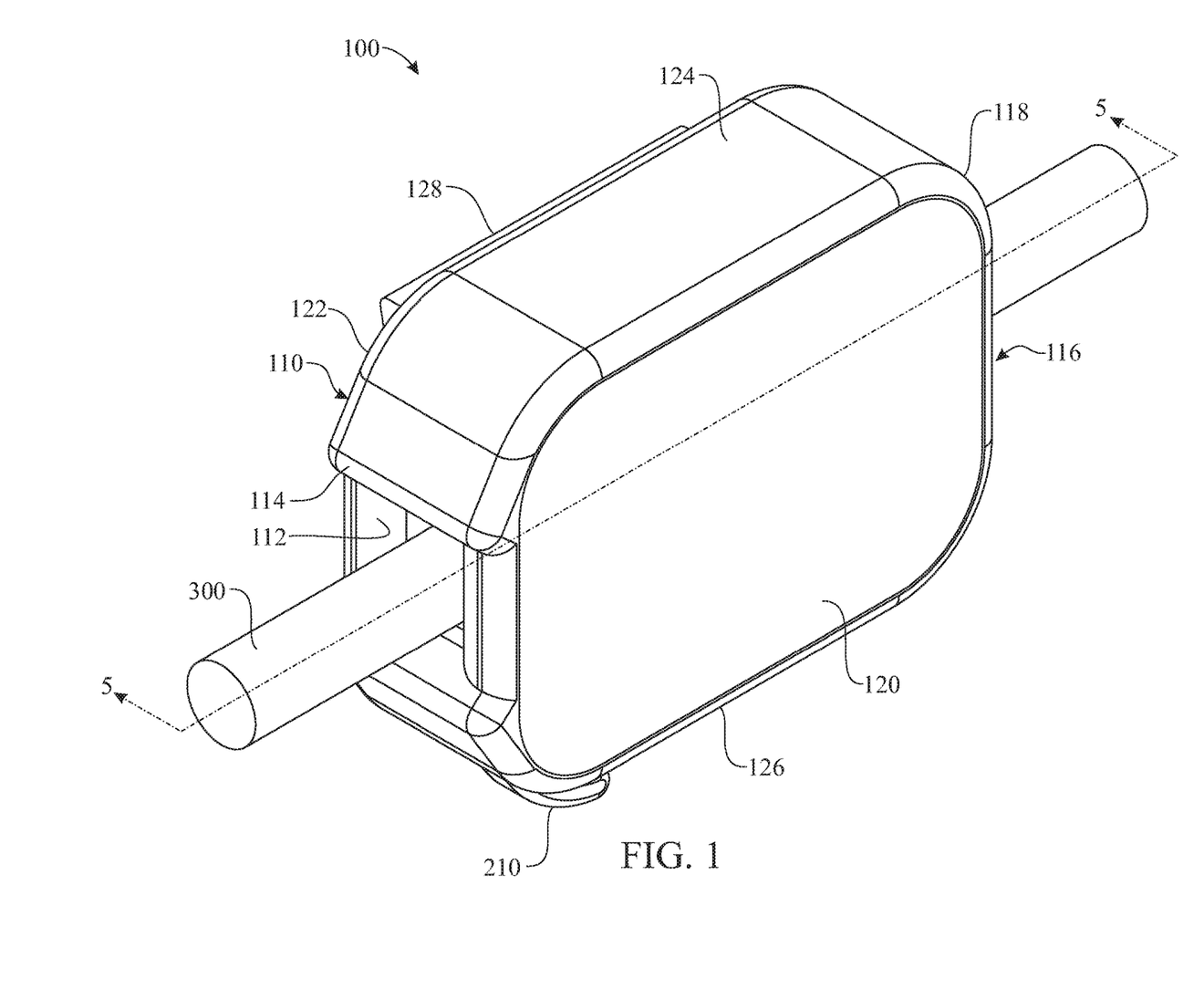
FIG. 1 presents a top front, left side isometric view of an orthodontic bracket in accordance with an illustrative embodiment of the present invention, with an archwire shown extended through the bracket.
Figure 2:
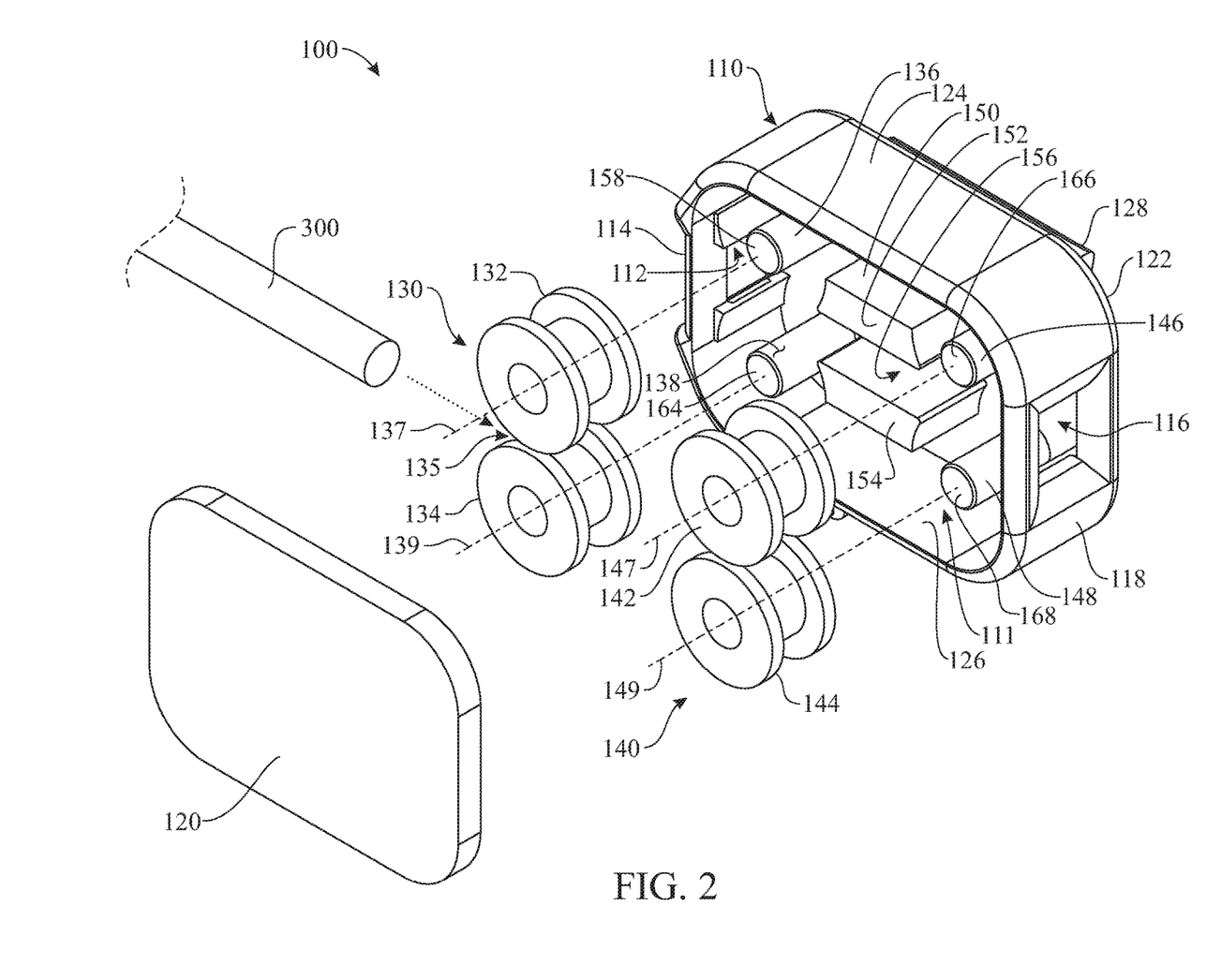
FIG. 2 presents an exploded, top front, right side isometric view of the orthodontic bracket of FIG. 1.

Referring initially to FIGS. 1 and 2, an orthodontic bracket 100 is illustrated in accordance with an exemplary embodiment of the present invention. As shown, the orthodontic bracket 100 is provided for receiving an archwire 300 therethrough and generally includes a rectangular, hollow housing 110 having a first opening or window 112 defined in a first end wall 114 of the housing 110 and a second opening or window 116 defined in an opposite, second end wall 118 (FIG. 2) of the housing 110. On a front side of the housing 110, a cover 120 is secured to the housing 110 to retain and support additional components within a cavity 111 in the housing 110 as described in more detail hereinbelow. The cover 120 can be shaped as a plate, as shown. In some embodiments, the cover 120 can be closed onto the housing 110 by gluing, welding, or frictional fitting, for instance and without limitation. In some embodiments, the cover 120 may be permanently closed onto the housing 110. In alternative embodiments, the cover 120 can be opened relative to the housing 110 to provide access to the cavity 111 within the housing 110.

Figure 3:
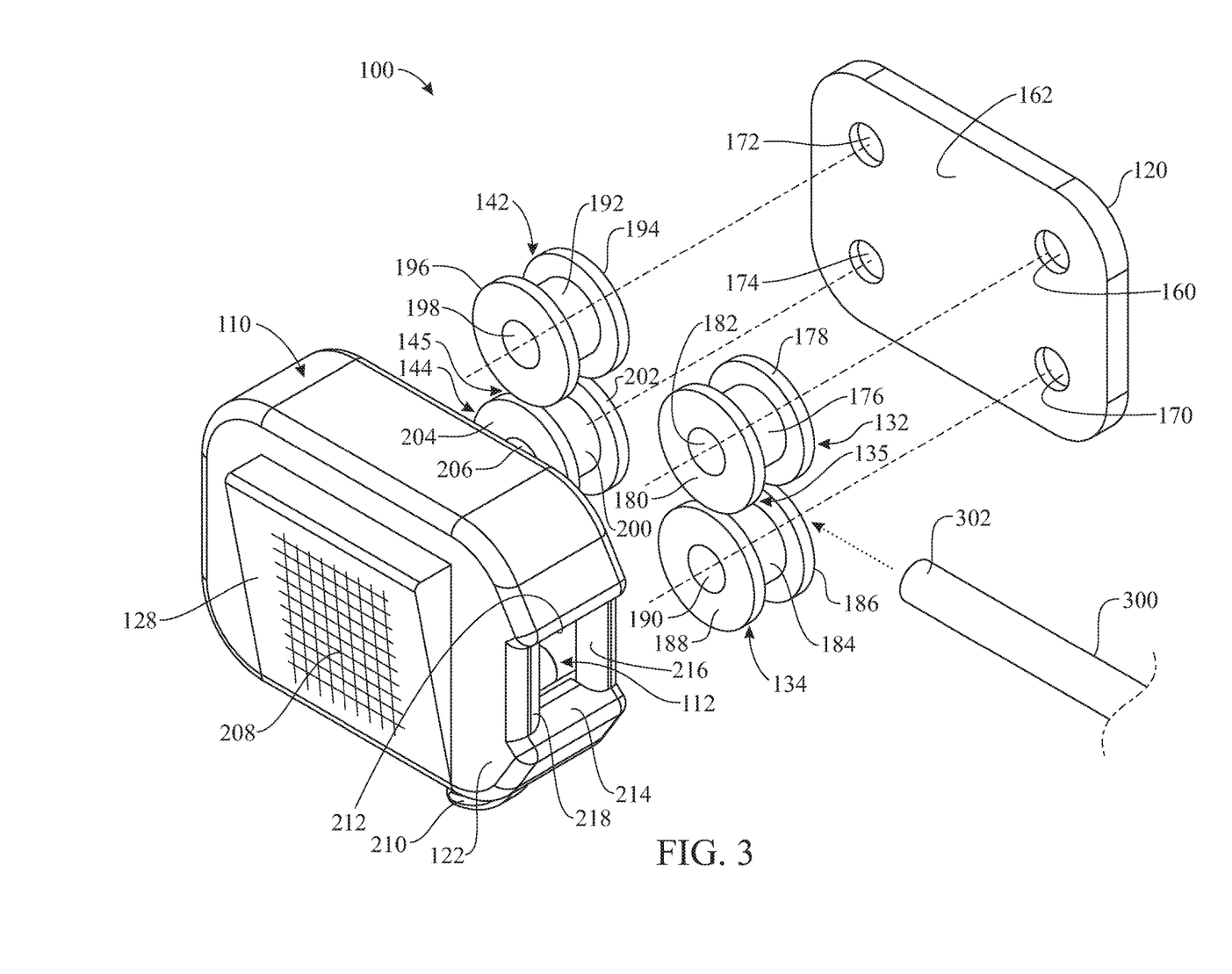
FIG. 3 presents an exploded, top rear, left side isometric view of the orthodontic bracket of FIG. 1.

The housing 110 additionally includes a rear wall 122, an upper wall 124 and a lower wall 126. The upper and lower walls 124 and 126 extend between the first and second end walls 114 and 118, as shown, and define the cavity 111 within the housing 110. As best shown in FIG. 3, a mounting block or mesh pad, hereinafter referred to as mounting block 128, extends outwardly from the rear wall 122 and is provided to facilitate attaching or bonding the orthodontic bracket 100 to a patient's tooth. The housing 110, along with the cover 120, are formed from a variety of bio-compatible materials including, but not limited to, metallic materials (e.g., stainless steel) or polymeric materials. Additionally, the rear wall 122 and the first and second end walls 114 and 118 along with the upper and lower walls 124 and 126 may be formed integrally; alternatively, one or more of the rear wall 122, the first and second end walls 114 and 118 and the upper and lower walls 124 and 126 may be formed separately from the remaining ones of the rear wall 122, the first and second end walls 114 and 118 and the upper and lower walls 124 and 126 may be formed and joined by known methods such as, for example, gluing, welding, etc.

Referring now to FIG. 2, in order to minimize the friction on the archwire 300 as it passes through the housing 110, the orthodontic bracket 100 includes a first set of rollers 130 rotatably mounted within the housing 110 and positioned adjacent the first window 112 defined in the first end wall 114 of the housing 110. The first set of rollers 130 includes a first upper roller 132 and a first lower roller 134. The first upper roller 132 is rotatably mounted on and supported by a first upper pin 136 extending into the cavity 111 from the rear wall 122. Similarly, the first lower roller 134 is rotatably mounted on and supported by a first lower pin 138 extending into the cavity 111 from the rear wall 122.

To further reduce friction on the archwire 300 and to guide the archwire 300 through the housing 110, the orthodontic bracket 100 further includes a second set of rollers 140 positioned adjacent the second window 116 defined in the second end wall 118 of the housing 110, Like the first set of rollers 130, the second set of rollers 140 includes a second upper roller 142 and a second lower roller 144. The second upper and lower rollers 142, 144 are rotatably mounted on and supported by a second upper pin 146 and a second lower pin 148, respectively.

The pins 136, 138, 146 and 148 supporting the first and second set of rollers 130 and 140 may be affixed to the rear wall 122 or may be formed integrally therewith. Additionally, the pins 136, 138, 146 and 148 may be treated with a variety of materials, such as, for example, graphite, Teflon™, etc, to reduce the friction between the pins 136, 138, 146 and 148 and the respective rollers 132, 134, 142 and 144.

As will be explained in greater detail hereinafter, the rollers 132, 134, 142 and 144 are spaced apart to allow the archwire 300 to pass therebetween and roll thereon. The rollers 132, 134, 142 and 144 are arranged parallel to one another, i.e. with their rotation axes 137, 139, 147 and 149, respectively, parallel to one another; in the present embodiment, the rotation axes 137, 139, 147 and 149 are arranged in a front-to-back direction of the housing 110, and coincide with central longitudinal axes of the pins 136, 138, 46 and 148.

As shown in FIG. 2, a wire guide 150 is positioned between the first set of rollers 130 and the second set of rollers 140 to prevent any bending, kinking or binding of the archwire 300 as is passes between the rollers 132, 134, 142 and 144. The wire guide 150 includes a generally elongate upper guide block 152 and a generally elongate lower guide block 154. The upper and lower guide blocks 152 and 154, respectively, also extend inwardly (i.e. into the cavity 111) from the rear wall 122 and are spaced apart from one another defining a wire guide gap 156 therebetween for passage of the archwire 300.

With reference to FIGS. 2 and 3, a free end 158 (FIG. 2) of the first upper pin 136 is supported in a support recess 160 (FIG. 3) formed in an inner surface 162 of the cover 120. This adds to the support of the first upper roller 132 within the housing 110. Similarly, free ends 164, 166 and 168 of the first lower roller 134, the second upper roller 142 and the second lower roller 144 are supported within respective support recesses 170, 172 and 174.

The disclosed rollers 132, 134, 142 and 144 are provided to support and guide the archwire 300 through the housing 110 with a little friction as possible. As best shown in FIG. 3, the first upper roller 132 includes a central shaft or drum 176, and end flanges or side walls 178 and 180 provided on the drum 176. A bore 182 is formed through the drum 176 for receipt of the first upper pin 136. Likewise, the first lower roller 134 includes a drum 184 and end flanges or side walls 186 and 188 along with a bore 190 formed through the drum 184 for receipt of the first lower pin 138. As shown in the drawings, a first roller gap 135 is formed between the drums 176 and 184 of the first upper roller 132 and first lower roller 134, respectively. The first roller gap 135 is configured to allow the archwire 300 to pass through, rolling on one or both of the drums 176 and 184 of the first upper roller 132 and first lower roller 134 when contacting the drums 176 and 184. The side walls 178, 180, 186, 188 of the first upper and lower rollers 132 and 134 prevent the archwire 300 from sliding out of the first roller gap 135 and binding against the interior of the housing 110 and the cover 120.

The second set of rollers 140 is formed identical to the first set of rollers 130. The second upper roller 142 includes a drum 192 and end flanges or side walls 194 and 196. A bore 198 is formed through the drum 192 for receipt of the second upper pin 146. The second lower roller 144 includes a drum 200 and end flanges or side walls 202 and 204 along with a bore 206 formed through the drum 200 for receipt of the second lower pin 148. As shown in the drawings, a second roller gap 145 is formed between the drums 192 and 200 of the second upper roller 142 and second lower roller 144, respectively. The second roller gap 145 is configured to allow the archwire 300 to pass through, rolling on one or both of the drums 192 and 200 of the second upper roller 142 and second lower roller 144 when contacting the drums 192 and 200. The side walls 186, 188, 194, 196 of the second upper and lower rollers 142 and 144 prevent the archwire 300 from sliding out of the second roller gap 145 and binding against the interior of the housing 110 and the cover 120.

While not specifically shown, the inner surfaces of the bores 182, 190, 198 and 206 of the drums 176, 184, 192 and 200, respectively, may also be treated with a substance designed to reduce friction with their respective pins.

Figure 6:
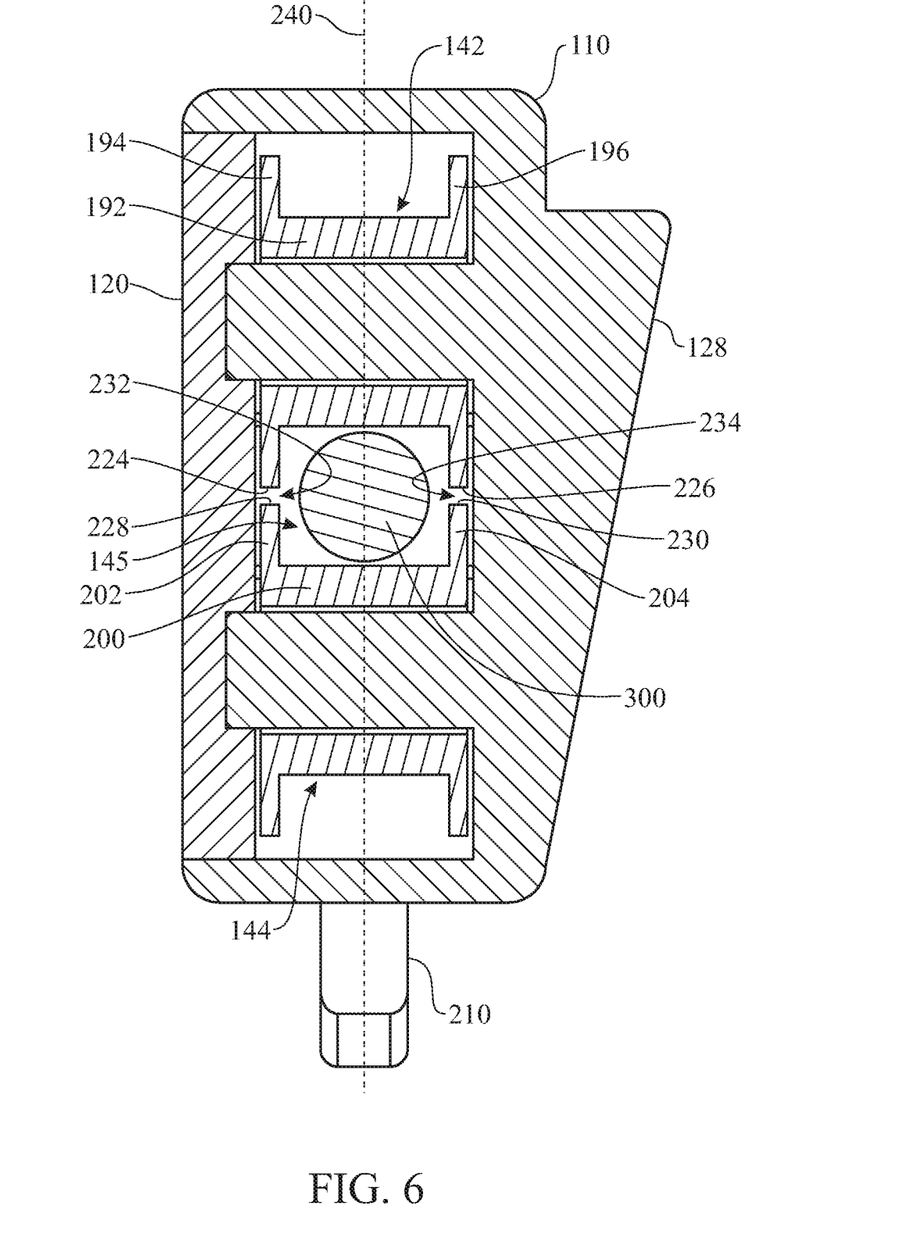
FIG. 6 presents a cross-sectional, right side elevation view of the orthodontic bracket of FIG. 1, the section taken along section plane 6-6 indicated in FIG. 5.

As best shown in FIG. 3, the angled mounting block 128 includes a textured rear face 208 which is provided to attach the orthodontic bracket 100 to a patient's tooth. The textured rear face 208 is treated so as to better retain an adhesive and allow the orthodontic bracket 100 to better adhere to the patient's tooth. As best shown in FIG. 6, the textured rear face 208 is arranged at an angle (i.e. not parallel) to a transverse, vertical plane 240 crossing a center of the roller drums 176, 184, 192 and 200.

Figure 4:
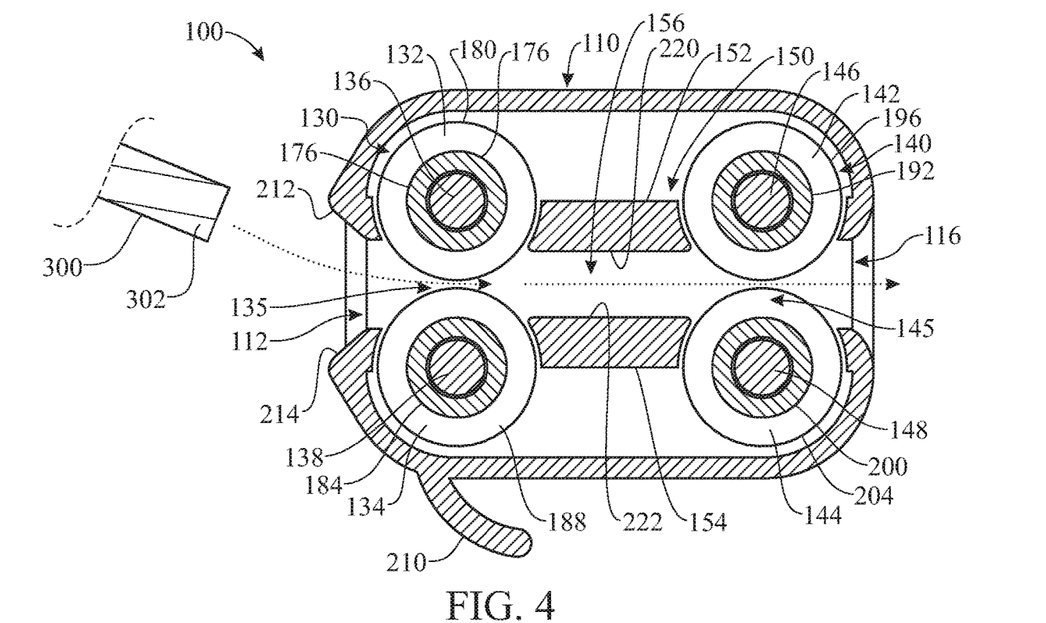
FIG. 4 presents a cross-sectional, front elevation view of the orthodontic bracket of FIG. 1, the section taken along section plane 5-5 of FIG. 1, prior to insertion of the archwire.
Figure 5:
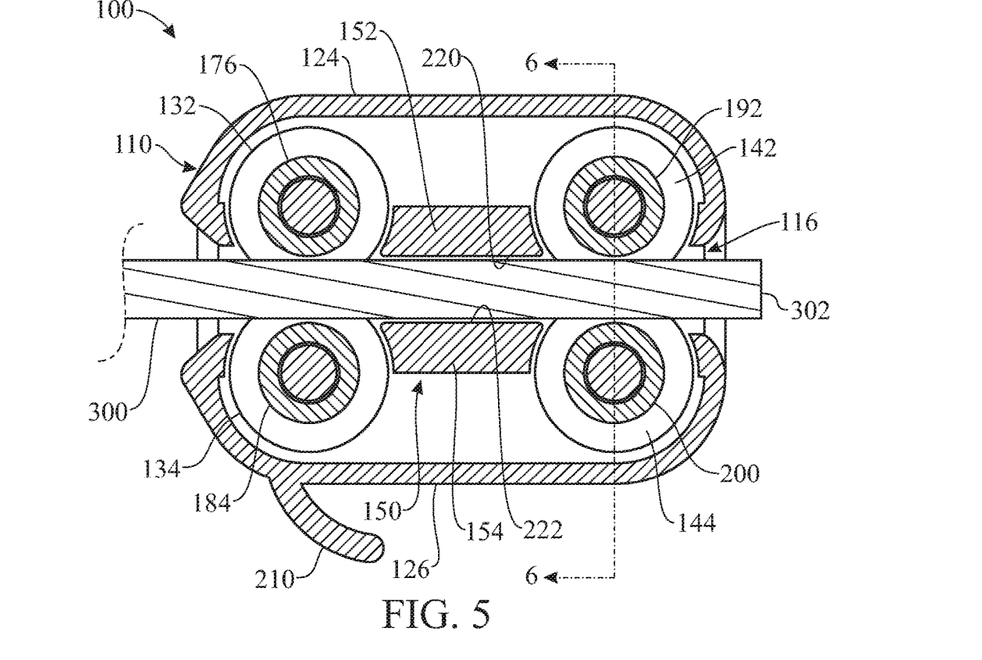
FIG. 5 presents a cross-sectional, front elevation view of the orthodontic bracket of FIG. 1, taken along section plane 5-5 of FIG. 1, with the archwire inserted through the orthodontic bracket as shown in FIG. 1.

As shown in FIGS. 1, 4 and 5, the housing 110 can additionally include an external, protruding hook 210. For instance and without limitation, the hook can extend downwardly from the lower wall 126, as shown. The hook 210 is provided to receive rubber bands (not shown) typically incorporated into a complete orthodontic system to assist in tensioning the orthodontic brackets 100 on the patient's teeth.

Referring now to FIGS. 3-8, the use of the orthodontic bracket 100 to guide and support the archwire 300 with minimal friction will now be described.

Initially, as shown in FIGS. 3 and 4, a free end 302 of the archwire 300 is advanced towards a window, for instance towards the first window 112 in the housing 110 of the orthodontic bracket 100, Angled entrance edges 212 and 214 (FIG. 4) and angle entrance edges 216 and 218 (FIG. 3) are provided on the first end wall 114 about the first window 112 to better guide the free end 302 of the archwire 300 into the housing 110, It must be noted that similar angled entrance edges are provided around the second window 116, as shown in FIG. 2, to facilitate introducing the archwire 300 through the second window 116 in an alternative example of a use of the orthodontic bracket 100.

With continued reference to the present use shown in FIGS. 3 and 4, as the free end 302 of the archwire 300 enters the housing 110, the free end 302 of the archwire 300 passes into the first set of rollers 130. Specifically, the archwire 300 passes through the first roller gap 135 between the drums 176 and 184 of the first upper roller 132 and the first lower roller 134. Should the archwire 300 engage the drums 176 and 184 of the first upper roller 132 or the first lower roller 134, the rollers 132 and/or 134 will turn with minimal friction about their respective first upper pin 136 and first lower pin 138 and facilitate advancement of the archwire 300. Additionally, the side walls 178 and 180 of the first upper roller 132 and the side walls 186 and 188 of the first lower roller 134 prevent the archwire 300 from sliding sideways and binding within the housing 100.

As best shown in FIG. 5, as the archwire 300 advances through the housing 110 of the orthodontic bracket 100, the arch wire passes through the wire guide 150 including the upper guide block 152 and the lower guide block 154, Specifically, the archwire 300 passes between an inner face 220 of the upper guide block 152 and an inner face 222 of the lower guide block 154, As noted hereinabove, the upper and lower guide blocks 152 and 154, respectively, prevent the archwire 300 from bending, kinking or binding as the archwire 300 passes between the first set of rollers 130 and the second set of rollers 140 within the housing 110. Further, the inner faces 220 and 222 may be treated with a material for further reduce the friction on the archwire 300 sliding therebetween.

As the archwire 300 continues through the housing 110 of the orthodontic bracket 100 it passes through the second set of rollers 140, i.e. through the second roller gap 145 between the drums 192 and 200 of the second upper roller 142 and the second lower roller 144, and exits out the second window 116. The engagement of the archwire 300 with the second set of rollers 140 is similar to that of the first set of rollers 130. The presence of the wire guide 150 assists in advancing the archwire 300 through the second set of rollers 140 with less risk of binding within the housing 110.

As best shown in FIGS. 4 and 5, the roller gaps 135 and 135 of the first and second sets of rollers 130 and 140, the wire guide gap 156 of the wire guide 150, the first window 112 and the second window 116 are aligned. This minimizes the length of archwire 300 extending through the housing 100 and thus also contributes to minimize the friction between the archwire 300 and the orthodontic bracket 100.

Thereafter, the free end 302 of the archwire 300 may be advanced toward a subsequent orthodontic bracket 100 and the process repeated. As can best be seen in FIG. 6, outer edges of the side walls of the rollers do not touch and each roller rolls independently of the adjacent rollers to minimize friction within the system. For example, as shown in FIG. 6, outer edges 224 and 226 of the side walls 194 and 196 of the second upper roller 142 do not engage outer edges 228 and 230 of the side walls 202 and 204 of the second lower roller 144. Indeed, a space or gap 232 exists between the outer edges 224 and 228 of the side walls 194 and 202 of the second upper roller 142 and the second lower roller 144, respectively. Likewise, a space or gap 234 exists and is provided between outer edges 226 and 230 of the side walls 196 and 204 of the second upper roller 142 and the second lower roller 144. The same is true for the first upper roller 132 and the first lower roller 134 of the first set of rollers 130.

Figure 7:
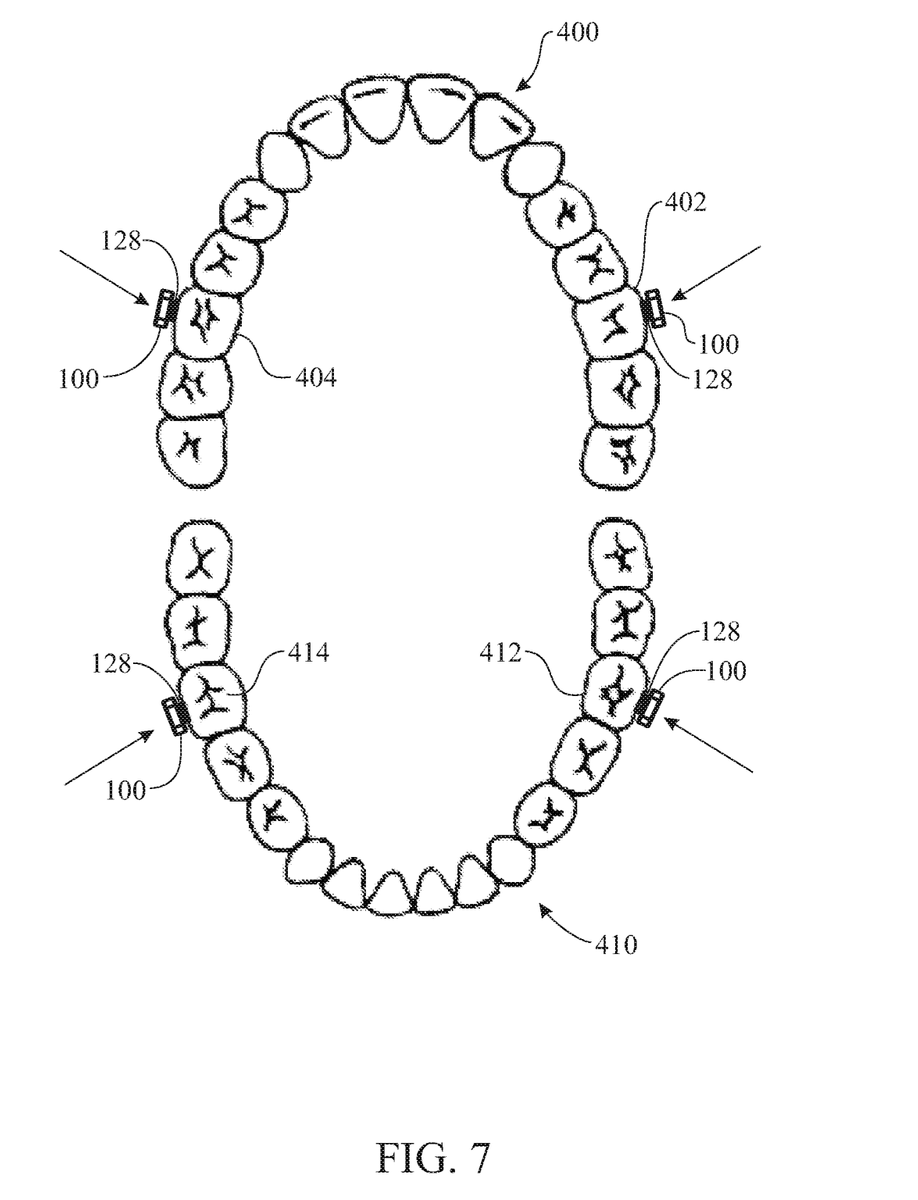
FIG. 7 presents a schematic view of four orthodontic brackets of FIG. 1, affixed at various locations on a person's teeth.
Figure 8:
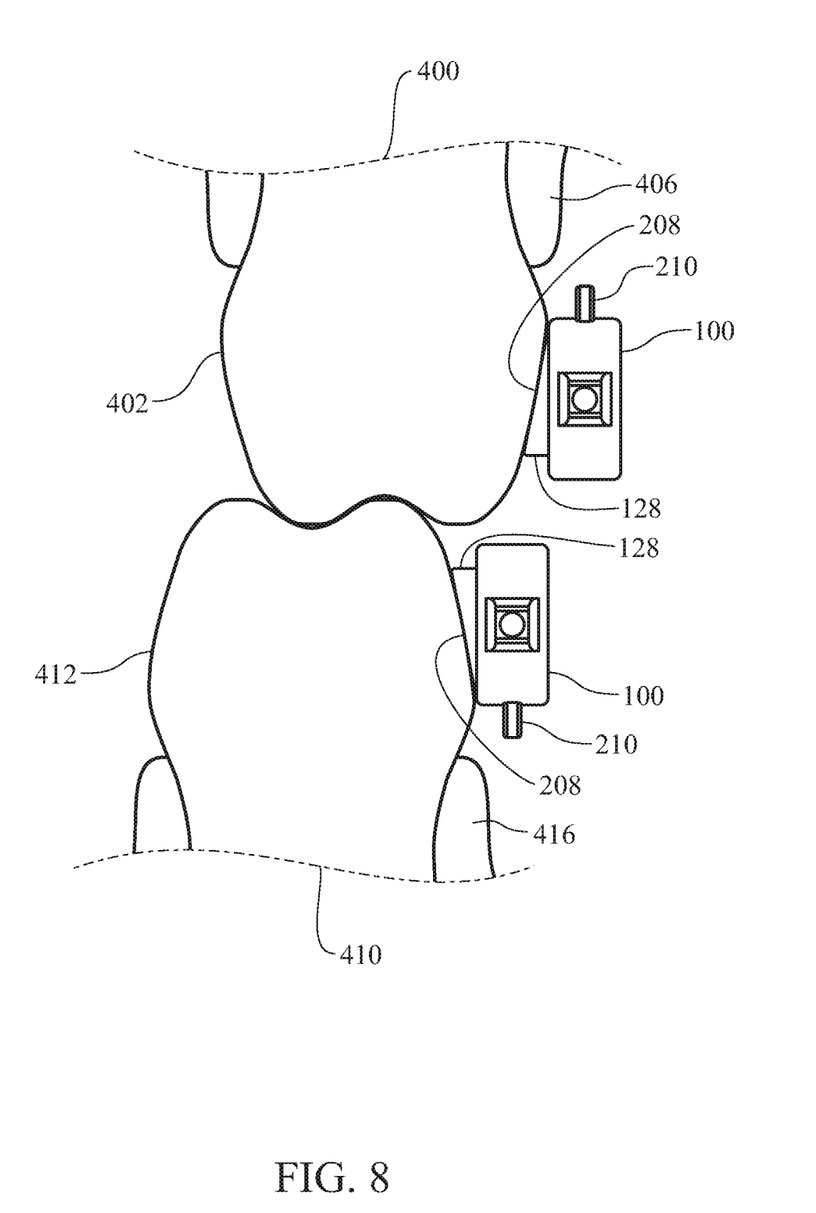
FIG. 8 presents an enlarged, front elevation view of two of the orthodontic brackets of FIG. 1 affixed to a pair of vertically opposed teeth.

Turning to FIGS. 6 and 7, several orthodontic brackets 100 are shown affixed to teeth 402 and 404 of an upper jaw 400 of a patient and to teeth 412 and 414 of a lower jaw 410 of the patient (FIG. 7). As noted above, the mounting blocks 128 of the orthodontic brackets 100 are used to attach the orthodontic brackets 100 to the teeth 402, 404, 412 and 414. An adhesive is provided on the textured rear faces 208 of the angled mounting blocks 128 of the orthodontic brackets 100 to adhere the orthodontic brackets 100 to the respective tooth. As further discussed hereinabove, the orthodontic brackets 100 are particularly suited for this type of application wherein teeth 402, 404, 410 and 414 are molars located at the back of the upper and lower jaws 400 and 410. Rubber bands (not shown) may be stretched between hooks 210 on the orthodontic brackets 100 located on the same jaw or different jaws to further tension the teeth. As shown, the hooks 210 of the orthodontic brackets 100 do not touch the patient's gums specifically the gum 406 of the upper jaw 400 or the gum 416 of the lower jaw 410.

The angled openings in one or both windows 112, 116 of the orthodontic brackets 100, as described herinabove, assist in inserting the archwire 300 especially when the brackets 100 are located in the back of the mouth on the patient's molars. The use of the first and second set of rollers 130 and 140 facilitate movement of the archwire 300 as the teeth are tensioned and while the system adjusts itself.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An orthodontic bracket for use in orthodontic procedures requiring the securing of an orthodontic archwire, comprising:
   a hollow housing enclosing an interior cavity, the hollow housing comprising a first end wall and a second end wall arranged opposite to the first end wall, the housing further comprising a first window extending through the first end wall and a second window extending through the second end wall, wherein the first and second windows communicate with the interior cavity of the housing; and at least one set of rollers located within the interior cavity of the housing, each set of rollers comprising an upper roller and a lower roller which are rotatable relative to the housing, the upper and lower rollers comprising a respective drum and a respective pair of protruding flanges provided on the respective drum, wherein the protruding flanges of the respective pair of protruding flanges are arranged in a spaced-apart relationship with one another and are configured to allow the passing therebetween of an archwire while preventing the archwire from slipping off the respective drum, wherein the drums are arranged in a spaced apart configuration defining a roller gap therebetween for the passing of an archwire therethrough and through the first and second windows.

2. The orthodontic bracket of claim 1, further comprising at least one set of pins extending inwardly from the housing into the interior cavity, each pin of the at least one set of pins rotatably supporting a respective roller of the at least one set of rollers.

3. The orthodontic bracket of claim 2, wherein the drum of each respective roller comprises a bore for receipt of the respective pin.

4. The orthodontic bracket of claim 2, wherein the housing further comprises opposed front and rear walls and opposed upper and lower walls, wherein the first end wall, second end wall, upper wall and lower wall extend from the rear wall to the front wall, and further wherein the rear, front, upper, lower, first end and second end walls define the interior cavity of the housing, and further wherein the at least one set of pins extends from the rear wall to the front wall.

5. The orthodontic bracket of claim 1, wherein outer edges of the protruding flanges of each respective roller of the at least one set of rollers are spaced apart from outer edges of the protruding flanges of the remaining roller of the at least one set of rollers.

6. The orthodontic bracket of claim 1, wherein respective rotation axes of the rollers of the at least one set of rollers are parallel to one another.

7. The orthodontic bracket of claim 1, wherein the at least one set of rollers comprises a first pair of rollers and a second pair of rollers.

8. The orthodontic bracket of claim 7, wherein the first pair of rollers is arranged closer to the first window than to the second window, and the second pair of rollers is arranged closer to the second window than to the first window.

9. The orthodontic bracket of claim 8, wherein the roller gap of the first pair of rollers faces the first window and the roller gap of the second pair of rollers faces the second window.

10. The orthodontic bracket of claim 1, further comprising a wire guide positioned in the housing and configured to guide the wire from one of the first and second windows to the other of the first and second windows, between the upper and lower rollers of the at least one set of rollers.

11. The orthodontic bracket of claim 10, wherein the wire guide comprises an upper guide block and a lower guide block, the upper and lower guide blocks defining a wire guide gap therebetween for passage of the archwire.

12. The orthodontic bracket of claim 1, wherein the at least one set of rollers comprises a first pair of rollers and a second pair of rollers, and the orthodontic bracket comprises a wire guide positioned in the housing and configured to guide the wire from one of the first and second windows to the other of the first and second windows, through the roller gap of the first and second pairs of rollers.

13. The orthodontic bracket of claim 12, wherein the wire guide comprises an upper guide block and a lower guide block, the upper and lower guide blocks defining a wire guide gap therebetween for passage of the archwire, wherein the wire guide is positioned between the first and second pairs of rollers in the housing, and further wherein the roller gaps of the first and second pairs of rollers and the wire guide gap of the wire guide are aligned.

14. The orthodontic bracket of claim 13, wherein the roller gaps of the first and second pairs of rollers and the wire guide gap of the wire guide are also aligned with the first and second windows.

15. The orthodontic bracket of claim 1, further comprising a mounting block extending outwardly from a rear wall of the housing.

16. The orthodontic bracket of claim 15, wherein the mounting block has an angled outer surface for attachment to a tooth.

17. The orthodontic bracket of claim 1, wherein at least one of the first window and the second window is delimited by one or more angled surfaces formed in the housing and configured to facilitate inserting an archwire therethrough from outside the housing.

18. An orthodontic bracket for use in orthodontic procedures requiring the securing of an orthodontic archwire, comprising:
a hollow housing enclosing an interior cavity, the hollow housing comprising a first end wall and a second end wall arranged opposite to the first end wall, the housing further comprising a first window extending through the first end wall and a second window extending through the second end wall, wherein the first and second windows communicate with the interior cavity of the housing, and further wherein the first end wall comprises angled entrance edges surrounding and defining the first window and configured to facilitate inserting an archwire into the interior cavity from outside the housing and through the first window, and the second end wall comprises angled entrance edges surrounding and defining the second window and configured to facilitate inserting an archwire into the interior cavity from outside the housing and through the second window;
a first pair of rollers and a second pair of rollers located within the interior cavity, each pair of rollers comprising an upper roller and a lower roller which are rotatable relative to the housing, the upper and lower rollers comprising a respective drum and a respective pair of protruding flanges provided on the respective drum, wherein the protruding flanges of the respective pair of protruding flanges are arranged in a spaced-apart relationship with one another and are configured to allow the passing therebetween of an archwire while preventing the archwire from slipping off the respective drum, wherein the drums are arranged in a spaced apart configuration defining a roller gap therebetween for the passing of an archwire therethrough and through the first and second windows; and
a wire guide located within the interior cavity of the housing and configured to guide the wire from one of the first and second windows to the other of the first and second windows, through the roller gap of the first and second pairs of rollers.

19. An orthodontic bracket for use in orthodontic procedures requiring the securing of an orthodontic archwire, comprising:

a hollow housing enclosing an interior cavity, the hollow housing comprising a first end wall and a second end wall arranged opposite to the first end wall, the housing further comprising a first window extending through the first end wall and a second window extending through the second end wall, wherein the first and second windows communicate with the interior cavity of the housing, and further wherein the first end wall comprises angled entrance edges surrounding and defining the first window and configured to facilitate inserting an archwire into the interior cavity from outside the housing and through the first window, and the second end wall comprises angled entrance edges surrounding and defining the second window and configured to facilitate inserting an archwire into the interior cavity from outside the housing and through the second window;

a first pair of rollers and a second pair of rollers located within the interior cavity with the first pair of rollers closer to the first window than to the second window and the second pair of rollers closer to the second window than to the first window, each pair of rollers comprising an upper roller and a lower roller which are rotatable relative to the housing, the upper and lower rollers comprising a respective drum and a respective pair of protruding flanges provided on the respective drum, wherein the protruding flanges of the respective pair of protruding flanges are arranged in a spaced-apart relationship with one another and are configured to allow the passing therebetween of an archwire while preventing the archwire from slipping off the respective drum, wherein the drums are arranged in a spaced apart configuration defining a roller gap therebetween for the passing of an archwire therethrough; and a wire guide comprising an upper guide block and a lower guide block, the upper and lower guide blocks defining a wire guide gap therebetween for passage of the archwire therethrough, wherein the wire guide is located within the interior cavity of the housing and positioned between the first and second pairs of rollers and is configured to guide the wire from one of the first and second windows to the other of the first and second windows, through the roller gap of the first and second pairs of rollers; wherein the roller gaps of the first and second pairs of rollers, the wire guide gap of the wire guide, the first window and the second window are aligned.

* * * * *